United States Patent [19]

Molitor

[11] 4,097,375
[45] Jun. 27, 1978

[54] HYDROCYCLONE SEPARATOR

[75] Inventor: Arvid A. Molitor, Elgin, Ill.

[73] Assignee: Luhring Chicago Industries, Des Plaines, Ill.

[21] Appl. No.: 763,808

[22] Filed: Jan. 31, 1977

[51] Int. Cl.² ............................................. B01D 13/00
[52] U.S. Cl. ................................. 210/23 H; 210/84; 210/512 R
[58] Field of Search ................... 210/73 R, 84, 512 R, 210/512 M, 304, 23 H, 500 M; 55/1, 459 R, 459 A–459 D; 209/144, 211

[56] References Cited

U.S. PATENT DOCUMENTS

| 938,702 | 11/1909 | Porbeck | 209/144 |
|---|---|---|---|
| 2,377,524 | 6/1954 | Samson et al. | 210/512 X |
| 2,418,061 | 3/1947 | Weinberger | 209/144 X |
| 3,391,787 | 7/1968 | Salomon | 210/84 |
| 3,724,674 | 4/1973 | Loison | 210/512 R |
| 3,904,788 | 9/1975 | Blaha | 210/500 M X |
| 4,051,300 | 9/1977 | Klein et al. | 210/500 M X |

Primary Examiner—William A. Cuchlinski, Jr.
Attorney, Agent, or Firm—Charles F. Pigott, Jr.

[57] ABSTRACT

The following specification describes a hydrocyclone having a porous media forming a wall portion of the hydrocyclone for separating dissolved salt and other impurities from a water stream under centrifugal force.

The hydrocyclone has an overflow port adjacent the cyclone base to provide an exit for the water stream containing a low proportion of salt and an underflow port adjacent the cone apex to provide an exit for a water stream containing a higher proportion of salt.

10 Claims, 4 Drawing Figures

HYDROCYCLONE SEPARATOR

FIELD OF THE INVENTION

This invention relates in general to a method and apparatus for the separation of materials and more particularly to an improved method and apparatus for the desalinization of water.

SUMMARY OF THE PRIOR ART

An important technique for the separation of materials and particularly for the desalinization of water is the passage of water containing dissolved salt nuclei across a porous membrane. On passage of the water across the membrane the salt nuclei or particles are restrained from passing through the membrane at a rate related to the pore size of the membrane and the pressure across the membrane, while the water moves over the membrane surface.

The quantity of salt removed is of course a function of the membrane pore size and the water flow rate or the area of surface contact between the membrane and the water. In order to increase the area of surface contact, closely spaced large area membranes are used requiring considerable pressures to maintain a reasonable flow rate between the membranes. This high pressure requires considerable expenditure of power.

In addition, since the volume of water passing between the membranes is restricted, the water is usually successively passed between a series of membrane layers in order to provide a sufficient quantity of water in a desired state of purity. Thus, desalinization is an expensive process requiring large amounts of power and membrane areas.

SUMMARY OF THE INVENTION

In order to increase the volume of water passing over a particle separating media and reduce the power required for moving the water across the media surface, the present invention utilizes a hydrocyclone having a wall or wall portion formed of a porous media for separating salt or other nuclei from water or other solvents.

In the hydrocyclone arrangement advantage is taken of the cyclonic effect creating high angular acceleration or centrifugal force with a relatively small total pressure drop across the hydrocyclone. The large centrifugal forces hold the higher density water containing the highest proportion of dissolved salt against the cone wall and the porous media for most effectively separating the salt from the water. Since the forward or total pressure drop is relatively small, large volumes of water can be moved relatively rapidly over the separating media surface.

Advantage is also taken of the hydrocyclone ability to separate fluid of different density by providing an overflow port adjacent the base of the hydrocyclone at which the fluid stream containing the lowest proportion of impurities exits for either use or further processing, and an underflow port adjacent the cone apex to provide a direct exit for the fluid in engagement with the cone wall and separating media and having the highest impurity concentration.

A void is generated at both the underflow port and the overflow port and advantage is taken of the rotation of the fluid passing the overflow port to create a region of turbulence, since the fluid exiting the overflow port has a direction of rotation opposite the incoming fluid. The different directions of rotation creates a region of shear and turbulence in which salt remaining in the relatively pure stream may be returned to the incoming stream for removal.

The division of the incoming stream into two streams of different impurity concentration and the minimization of the total pressure drop is preferably achieved by a hydrocyclone design having small cone angles of for example less then eleven degrees.

It is therefore a primary object of the present invention to provide an improved method and/or apparatus for separating a contaminant from a fluid stream.

It is another object of the present invention to provide an improved method and/or apparatus for separating salt nuclei from water.

It is still another object of the present invention to provide an improved method and/or apparatus for dividing a fluid into streams having different impurity concentrations.

Other objects and features of the present invention will become apparent on examination of the following specification and claims together with the accompanying drawings.

DESCRIPTION OF THE PREFERRED EMBODIMENT

Figure 2:
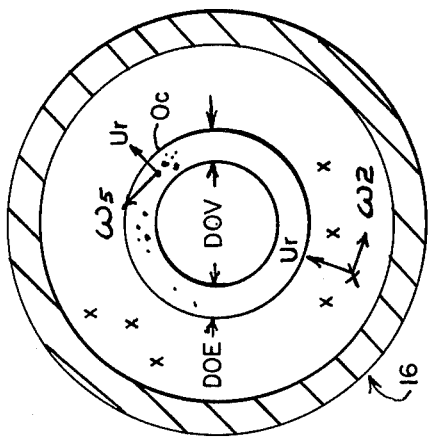
FIG. 2 is a generally schematic cross-sectional view of the cyclone to illustrate certain radial and rotational forces.
Figure 1:
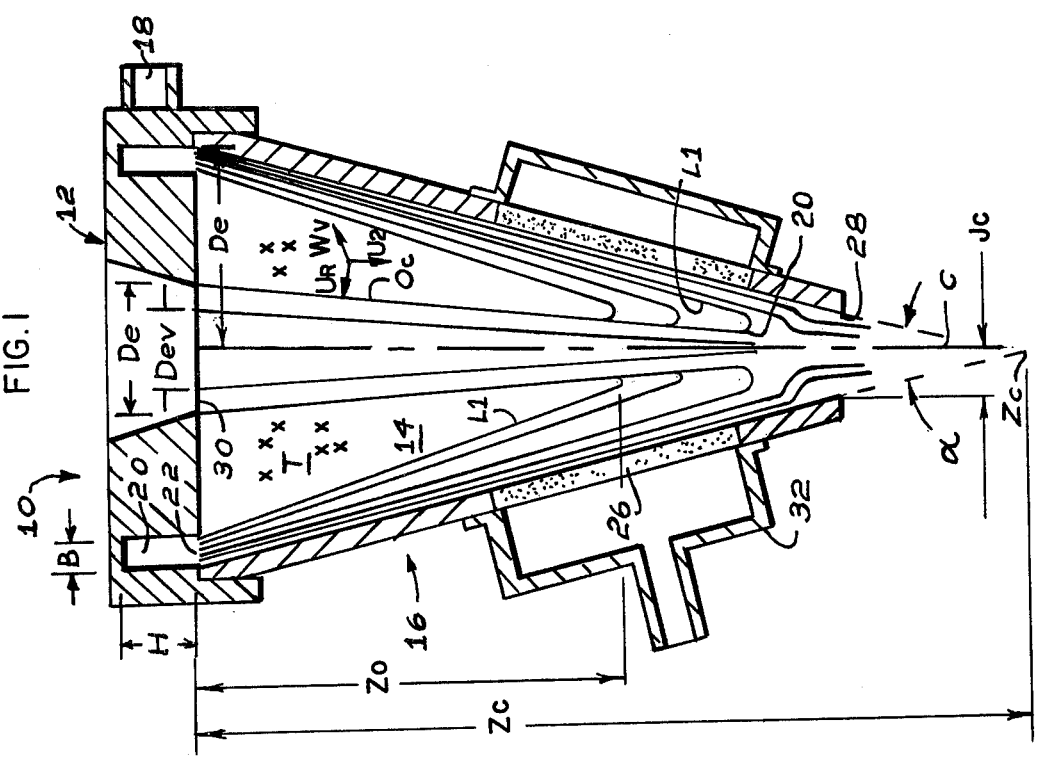
FIG. 1 is a sectional view of a hydrocyclone incorporating the principles of the present invention and illustrating certain flow streams.

In FIG. 1 a hydrocyclone separator employing the principles of the present invention is indicated by the reference character 10. The separator 10 includes a header assembly 12 for introducing a fluid into a conical chamber 14 formed by a conical wall assembly 16, which provides a high angular acceleration to a fluid introduced therein from the header assembly 12.

The header assembly 12 is located adjacent the base of the chamber 14 and includes an inlet port 18 having a cross-sectional area A1 and an annular inlet chamber 20 having a cross-sectional area A2. Chamber 20 communicates with the base of the conical chamber 14 through an annular cone inlet port or orifice 22. The orifice 22 has an outer diameter corresponding to the base of the chamber 14 and a cross-sectional area A3.

The wall assembly 16 includes a conical wall of suitably rigid material capable of withstanding the chemical action of the materials introduced therein. The conical wall includes one or more generally circumferential and/or axially extending segments 26 of a porous separating media for rejecting impurities contained or dissolved in the fluid introduced into the chamber 14 and passing only the fluid. Fluid containing dissolved salt is passed to an underflow port 28 having a diameter Jc and to an overflow or outlet port 30 having a diameter De.

Typical porous media for separating dissolved salt or salt nuclei from water or a heavier liquid from a lighter liquid are structurally strong porous plastics such as a polypropylene or similar membrane, or the more recently developed fiber separating media. It is believed that woven or spun glass fibers or filaments can advantageously be used as the porous media. The term porous media or membrane will therefore be understood to cover a wide variety of structural arrangements capable of passing material of one size or density and rejecting material of another size and density. The porous media may, of course, form the entire conical wall depending on its strength and rigidity or the area required for supporting the structure.

The clean fluid passed through the media or membrane 26 is conducted to a collecting conduit 32 for use. Fluid containing the major quantity of impurities passes through the underflow port 28, and a stream with a low concentration or minor proportion of impurities passes through the overflow port 30.

The chamber 14 thus defines a cone or conical cyclone having a base diameter $Dc$ coincident with the outer diameter of orifice 22. The underflow port 28 and the overflow port 30 are coaxial with the central axis C of the chamber 14. The underflow port 28 is located at an axial position spaced from the apex $Zc$, and the overflow port 30 is spaced at the base of the chamber. The underflow port has a diameter $Jc$ and the overflow or outlet port 30 has a diameter $De$ with the underflow port 28 having adjustment means (not shown) for regulating the back pressure and the overflow port 30 being flared radially outwardly of the base for reducing the pressure thereat on fluid exiting the port.

Fluid enters the cyclone 10 at inlet 18 at a rate or velocity Q1 with a linear momentum U1 which is converted into angular momentum U2 proportional to $Q1R^2w$ by the annular channel or chamber 20 and enters the cone chamber 14 through the annular orifice 22. The angular velocity component $w$ of the angular momentum U2 is inversely proportional to the fluid radius of gyration R. A narrow orifice 22, which tends to maximize R would therefore reduce $w$. If expansion occurs between inlet 18 and orifice 22, angular velocity will also be reduced, wherefore the cross-sectional area A2 of the annular chamber 20 is preferably held to the same value as the area of the inlet 18 so that $A1/A2 = 1$.

The fluid enters the cone chamber 14 through the orifice 22 and acquires an axial component of momentum $Uz$ in reaction with the top wall of chamber 20 and on reaction with the wall of the cone chamber 14 acquires a radial component of momentum $Ur$ for moving the fluid toward the cone axis C. The inlet flow cross-section at orifice 22 may be one or more thin rectangular windows, which produce a ribbon-like flow that tend to distort and shred as they are forced into the conical chamber. The ribbon-like flow becomes wavy-like tubes or filaments spiraling toward the cone apex with the less dense fluid turning inward toward the cone axis as indicated by traces L1 in FIG. 1, and then spiraling toward the outlet port 30. Circular cross-section inlet flow may be provided by circular tubes or jets providing flow into the annular chamber 20.

With cyclonic circulation introduced by the rotational momentum the heavier fluid is forced toward the cone wall. This fluid moves toward the underflow port 28 with an increase in angular acceleration to increase the centrifugal force on the wall of the cone. However, the total momentum, ignoring frictional and shear forces, remains constant. Flow through port 28 is at a rate Q4.

The fluid density is, of course, related to the concentration of impurities, and since the fluid portion with the highest salt concentrations is heavier, it moves more closely to the cone wall as that portion has the greater increase in angular acceleration and is subject to the greater centrifugal force, which can exceed 10,000 g's per unit mass, as distinguished from that fluid portion flowing along the traces indicated at L1. The higher density fluid containing the high concentration of salt nuclei is therefore held in engagement with the porous media 26 for separating the salt nuclei from the fluid. The water passes through the porous media 26 and is collected in the collecting conduits 32 for removal, while the heavier salt nuclei in close association with the cone wall passes through the underflow port 28 at rate Q4.

Fluid passing through port 28 contains a high percentage of impurities and generates a vortex at a radial plane or level Z4 above the port 28. The vortex has a void diameter $Dz$ at level Z4 and the remaining fluid moves through the outlet port 30 at a rate Q5. The vortex generated at Z4 and the underflow port 28 creates a reduced gauge pressure thereabove and acts as a rotating nut on the air passing centrally therethrough if discharged to atmosphere.

Above the level Z4 fluid streams indicated by traces L1 flow through the outlet port 30 in an outlet cone OC extending from a level $Zo$ above the cone apex with a direction of rotation opposite from that at inlet 22 and from the vortex extending through the underflow port 28. The streams indicated by traces L1 contain a lower level of impurities than the inlet stream and after passage through the outlet port 30 is available for use or for recycling.

Figure 4:
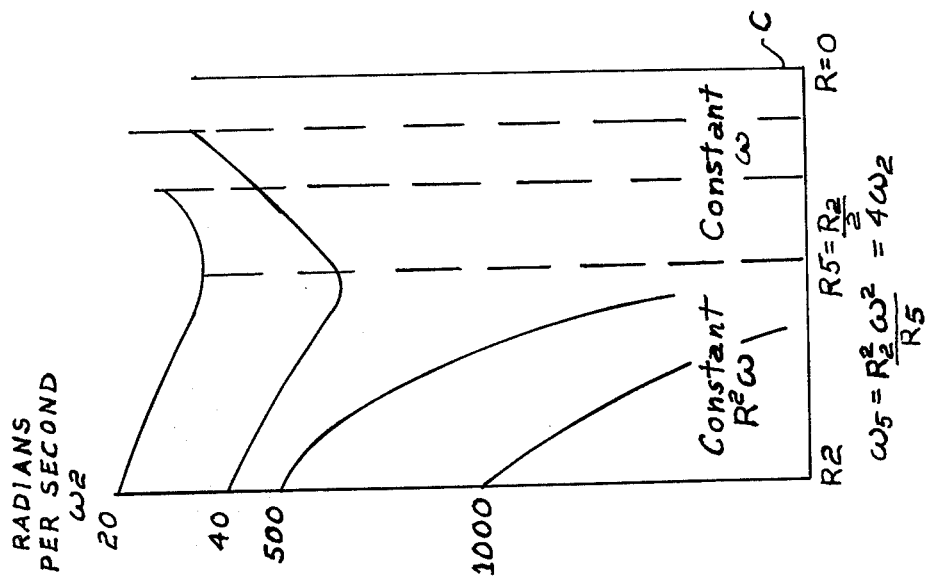
FIG. 4 illustrates angular velocity relationships between different flow streams.

The fluid streams indicated by traces L1 acquire a radial inward component of motion $Ur$ and move with a slower rotational velocity than the fluid exiting underflow port 28. As may be seen in FIG. 4 these rotational velocities may be as low as 20 to 40 radians per second. The streams L1 move downwardly with an axial velocity component of momentum $Uz$ and radially inwardly with a radial velocity component of momentum $Ur$ in which they bend through an angle of 180° to the initial axial direction at orifice 22 until they reach the surface of outlet cone OC spiraling upwardly toward the overflow outlet port 30. The inverted apex of each bowl is thus located intermediate the cone wall and the surface of the outlet cone OC.

The outlet cone has a diameter $De$ on passing through the outlet port 30 and at its lowest level $Zo$ has an inner or void diameter $Dov$ and an outer diameter $Doe$.

At the level $Zo$ the fluid is at minimum rotational velocity and has a maximum velocity head whereafter it moves toward the overflow port 30 in a rotational direction opposite that acquired in annular chamber 20 and with a constant rotational magnitude decreasing in the direction of port 30. This movement through the overflow cone generates at the outer cone surface a region of considerable shear force between the fluid above the trace L1 and the header assembly to establish a region T of considerable turbulence extending to the inner diameter of port 22 for continuous separation of higher and lower density fluids.

It will be noted that the rotational velocity head increases to a maximum near the void radius where rotational shear is large enough to dissipate some rotational energy. This shear has little effect on axial and radial velocity components as compared to that on the rotational kinetic energy adjacent the void surface so that flow continuity is maintained above the level $Zo$.

A constant $R^2w$ region extends through the outlet cone outer surface toward the void cone inner surface. The radial component of flow in the outlet cone is directed toward the axis creating a radial velocity $Ur$ with per unit fluid mass rotational energy of $U^2/2g$. The rotational energy radial flow rate normal to any radius vector therefore is proportional to $(U^2w/g)$ from which is subtracted the power dissipation $udU^2w/dR\ 2g$ to obtain the radial flow of rotational kinetic energy, which is equal to 0 at the void cone surface except where the linear flow turns abruptly toward the outlet.

The rotational velocity head thus first acquires a maximum value and then rapidly decreases near the void radius as do the radial and rotational velocities. The rotational shear vector approaches 0 at the radius of maximum velocity head and then as flow changes direction the rotational shear vector reverses direction to assume a direction opposite that occurring initially on entering the chamber.

Above the lowest outlet flow level $Zo$ and between the void surface and the outlet cone surface uniform angular velocity develops. The rotating fluid layers near the outlet cone surface rotate layers close to the void surface in response to rotational shear torque and the angular velocity, which is uniform at each axial cross-section, decreases in magnitude along the axial flow path toward the outlet. Without an underflow port and with rotational energy flow at the $Zo$ level with constant $w$ equal to 0 and $$Uro = Uzo \frac{Dov}{2(Zc - Zo)}$$

the void diameter $Dov$ is proportional to $4u/Uro$. The ratio $Dov/2(Zc-Zo)$ is for cone angles of less than 11°, the half angle (in radians) of the void cone. The mean value of the axial velocity $Uz$ in the outlet cone for a full cyclone without underflow port is proportional to $4Q/Doe$, where $Doe$ is the outlet cone diameter at the $Zo$ level. The ratio $(Dov/Doe)$ of the void diameter to the outlet cone diameter for cones of less than 11° is proportional to $$\frac{1}{\frac{1+Q}{2\pi(Zc - Zo)}} \text{ and } (Zc - Zo)^2 = \frac{(2)^2}{(\alpha)^2} \frac{(Dc - B)B}{1 - (\frac{De}{Dc})^2}.$$

Therefore, the smaller the cone angle the greater the distance between $Zo$ and the apex $Zc$ and the smaller the ratio between $Dov/Doe$ and on selecting the quantity of flow and the corresponding cone parameters the outlet cone parameters are determined.

When an underflow port is provided the level $Z4$ at which the underflow vortex cone intersects the outlet cone is determined from the equation $(Dc^2-De^2)(Zc-Z4)^2=(2Zc)^2 (Q4/Q)(Dc-B)B$ so that on selecting the ratio $Q4/Q$, the level of $Z4$ is determined. The underflow void diameter is $Jc=Dc(Zc-Z4)/Zc$ and $$\frac{Q4}{Q} = \frac{(\frac{Jc}{2})^2}{(Dc - B)}.$$

Figure 3:
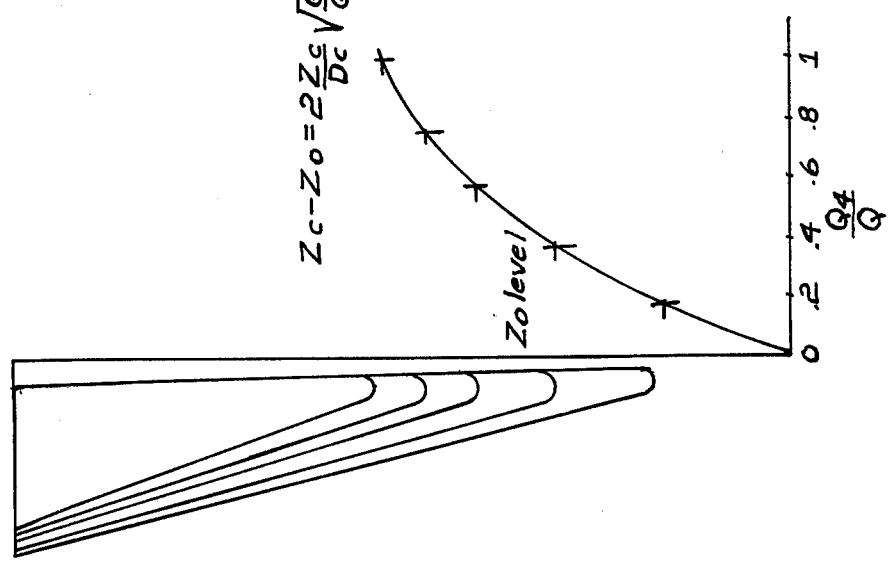
FIG. 3 is a graph illustrating the relationship between flow through the underflow port and the level of Zo.

The distance from the cyclone apex to the intersection of any inlet flow line with the outlet cone surface is therefore proportioned to $Q4/Q$, which is graphed for values 0-1 in FIG. 3. With knowledge of the void diameter at $Zo$ the void diameter of the underflow port and the outlet an overflow port can be calculated. The void diameter $Jc$ at the underflow port is $$Jcv = \sqrt{\frac{Q4}{Q}} \frac{\sqrt{\frac{Dc^2 - De^2}{Dc^2}}}{(De^2 - Dov)^2 - Zc(Zc - Zo)}$$

and the outlet cone port diameters are $$\frac{(Dev)^2}{(De)} = 1 + \frac{(Dov)^2}{(De)} - \frac{(Zc - Zo)^2}{(Zc)} =$$

$$1 - \frac{(Zc - Zo)}{(Zc)} \left[ 1 - \frac{(Dov)^2}{(Doe)} \right]$$

The pinch or damping effect produced by fluid shear near the underflow port 28 assists in the division of flow between the underflow and overflow ports as the pressure field actuates the reversal of linear momentum and forces most of the fluid up the outlet cone. Linear flow in the outlet cone OC is more rapid than movement along the wall of the chamber 14 and rotational velocities at the surface of the outlet cone are also higher than those occurring at the traces L1 while the radial component of motion of the traces L1 are directed toward the cyclone axis and those in the outlet cone are directed from the axis. No solid boundary is required for confining fluid flow to the cone wall and enables fluid and/or suspended solids to move through the outlet cone surface and into turbulent region T. The circulation within the turbulent region consists of one or more localized eddies maintained by the shearing action of the oppositely directed inlet and outlet flow channels.

The largest portion of the cyclone pressure drop occurs at the entrance 22 to the inlet cone 14. Wall friction may reduce velocities slightly at the wall of chamber 14 and internal fluid shear constrains the velocity of the fluid elements spiraling toward the central axis. However, internal shear does not dominate or the fluid would rotate as a solid mass with constant angular velocity. Therefore, only in the outlet cone where friction is dominant does rotation occur with constant angular velocity.

The change or pressure drop of the fluid traversing the separator 10 is proportional to the difference in rotational or angular velocity component $w2$ of the momentum $U^2w2$ at the orifice 22 and the rotational component $w5$ of the outlet cone surface. As the rotational velocity increase is from 0 at the cone axis to $w5$ at the outlet cone surface the velocities are related by the formula $w5 = Dc/De$ and the total pressure drop is proportional to $2(Dc^2/De^2-1)A1^2/A2^2U1^2/2g$ for a cyclone with a narrow annular chamber 20. Thus, with $A1=A2$ and $Dc=2De$ the pressure drop is substantially 7 velocity heads.

Another source of pressure drop arises from the force exerted by the fluid along the traces L1 bending through an angle of 180°. This force Y is proportional to $A3P3+A5P5+Q(U3+U5)$ where $U3$ and $U5$ are axial velocities at orifices 22 and 30 respectively, and $P3$ and $P5$ are the respective pressures thereat, which may be ascertained. The cross-sectional area $A3$ at orifice 20 is substantially $4A5$ since the geometric area is $4\pi De$ without considering the void area at the central axis. The resultant bending force Y is therefore proportional $A3P3 + C_{35}p$ where $p$ is the incremental pressure required to alter the linear momentum between orifice 22 and port 30 and C35 has a numeric value greater than 10.

The force Y reacts with the pressure field supporting the fluid having the incremental pressure $p$, which must be less than P3. The incremental pressure is therefore proportional to a value $C_{36}$, which is the ratio of the enveloping surface around the bend to twice the inlet area of the bend or S/2A3.

With the surface S in the form of a torus the ratio $S/2A3 = \pi R/r$ with R the radius to axis C and $r$ the cross-sectional radius of the torus. This ratio is always greater than $\pi$ and when selected at a value of 7, the ratio $S/2A3$ is at least 21. This ratio increases as $Zc/Dc$ so that for a value of 21, $Zc/Dc = 5$. As the angle $\alpha$ is proportional to the reciprocal of $Zc/Dc$, small values of $\alpha$ correspond to large values of $C_{36}$. The pressure drop required to turn the fluid through 180° thus diminishes as the cone angle becomes smaller. With a ratio $(A1/A3)^2 = 1/16$ the pressure required to produce the 180° bend with values for C35 and $C_{36}$ selected above can be less than 1/32nd of one velocity head.

The total cyclone pressure drop is therefore proportional to $2(A1^2/A3^2+1) + 2(Dc^2/De^2-1)$ and the expansion contraction losses $0.5U^2/2g$. With $A1/A3=1/4$; $Dc/De=2$ and $A1/A2=1$ the pressure drop is substantially $U1^2/2g$ or $0.56\, Q1^2$.

It is apparent therefore that the most significant portion of the cyclone pressure drop occurs as a result of friction for generating rotational momentum. This frictional factor may be increased to generate additional rotational momentum by increasing the outlet velocity at port 30 relative to the inlet velocity at port 18 by increasing the value of $Zc$ and the diameter of port 30 relative to the base diameter $Dc$.

The ratio of cone volume to inlet flow gives a measure of the transit time $T = \pi/12\,(Dc^2Zc/A1U1)$ of the cyclone and with an angular velocity $w5 = 2Dc/Doe\,(A1/A2)U1$ the typical number of revolutions is $$\left(\frac{Dc^4}{Doe^2}\right)\frac{1}{24\,A_2^2 \tan\left(\frac{\alpha}{2}\right)}.$$

This formula indicates that the typical number of revolutions increases as $Zc$ increases for providing a smaller cone angle $\alpha$.

It will be appreciated that the design concepts described above are predicated on the use of an incompressible fluid such as water. However, when the entraining fluid is a gas such as air, the qualitative functions are subject to similar analysis although the quantitative results may differ significantly from those described.

The foregoing is a description of a hydrocyclone having a porous wall for separating a salt from water passing along the wall. However, it is believed that the inventive concepts are not limited to the embodiment described, but are covered in the accompanying claims.

What is claimed is:

1. A method for separating a solvent from a solute, the improvement comprising introducing solute-containing solvent in tangential manner into a conical chamber adjacent the base thereof, to impart a spiral path of flow to said solute-containing solvent, and passing said spirally moving solute-containing solvent over porous media defining at least a portion of said conical chamber, and passing solvent outwardly through said porous media for separation from solute said porous media being of the type to permit the flow of solvent therethrough while preventing the passage of said solute.

2. The method claimed in claim 1 in which a rotational momentum is imparted to said solute-containing solvent at said base and said solute-containing solvent is thereafter divided into a stream containing a relatively low amount of solute having an axial flow direction toward said base and a stream containing a relatively high amount of solute having an axial flow direction toward the apex of said chamber.

3. The method claimed in claim 2 in which the low solute stream has a direction of rotation opposite that of the fluid introduced into said chamber.

4. The method claimed in claim 3 in which said low solute stream has a substantially constant angular velocity in one radial plane through said stream and said angular velocity diminishes in the axial direction extending toward said base.

5. The method claimed in claim 4 in which an overflow port is provided adjacent the base of said cone for enabling said low solute stream to flow from said chamber, and the diameter of said port is approximately one half the diameter of said base.

6. The method claimed in claim 5 in which the velocity of said low solute stream through said overflow port is in excess of the inlet velocity of said solvent.

7. The method claimed in claim 6 in which said conical chamber has a cone angle of less than 11 degrees.

8. The method of claim 1 in which said solvent is water and said solute comprises salt.

9. The method of claim 8 in which said porous media comprises a fibrous material.

10. The method of claim 9 in which said porous media comprises glass fibers.

* * * * *